Dec. 31, 1946.      E. E. LIBMAN      2,413,573

FIRE CONTROL SYSTEM

Filed Aug. 21, 1944      3 Sheets—Sheet 1

INVENTOR.
EARL E. LIBMAN

BY *Edward L. Mueller*

ATTORNEY

Dec. 31, 1946.  E. E. LIBMAN  2,413,573
FIRE CONTROL SYSTEM
Filed Aug. 21, 1944  3 Sheets-Sheet 2

Wind Correction Chart

Range Spot Chart

Sight Deflection Chart-mls

Present Range Chart - Hundreds of Yards

Sight Angle Chart-Minutes

INVENTOR.
EARL E LIBMAN
BY Edward L. Mueller
ATTORNEY

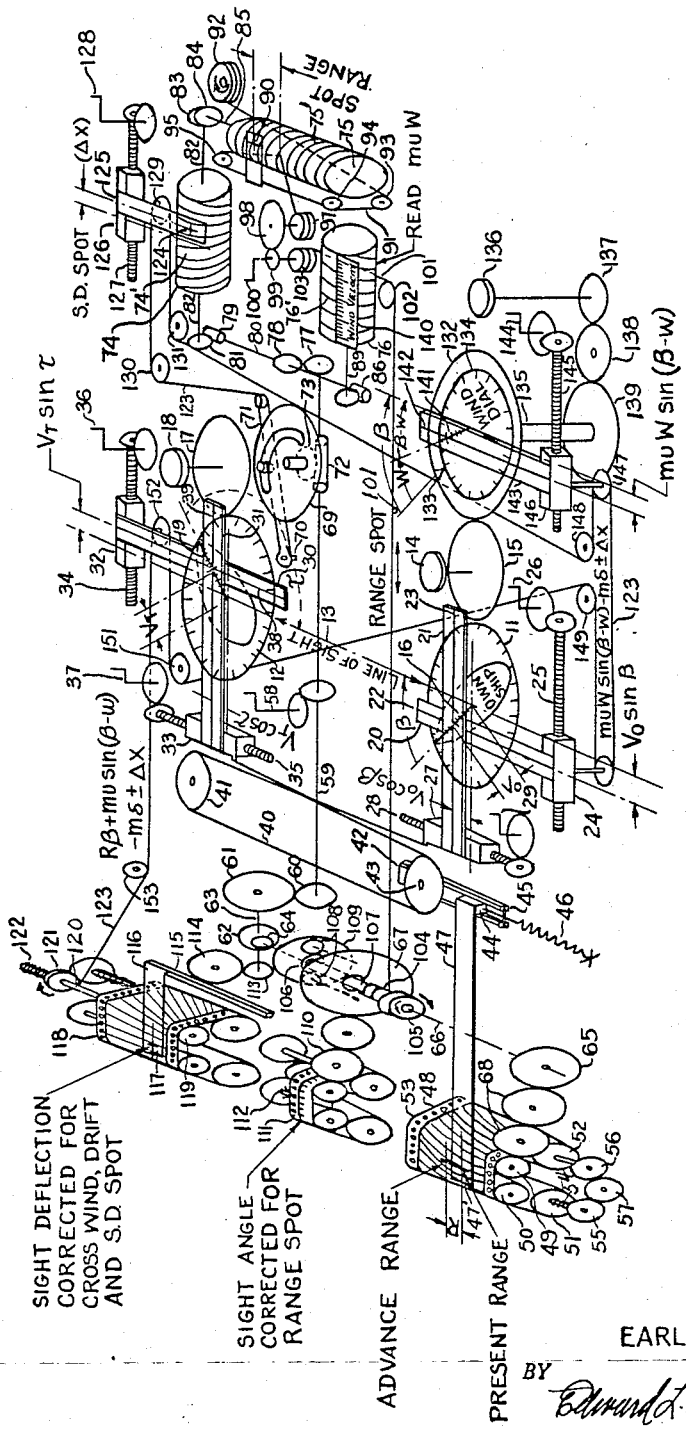

Patented Dec. 31, 1946

2,413,573

UNITED STATES PATENT OFFICE 2,413,573

FIRE CONTROL SYSTEM

Earl E. Libman, Brooklyn, N. Y., assignor to Control Instrument Company, Inc., Brooklyn, N. Y., a corporation of New York Application August 21, 1944, Serial No. 550,466

6 Claims. (Cl. 235—61.5)

1

This invention relates to improvements in fire control systems and has particular reference to a computer and method of operation especially adapted for use in surface fire from a moving ship to a moving target.

It is proposed, by the present invention, to obtain improved accuracy of fire by manually setting in the instrument the own ship and target speeds, the relative target bearing and target angle, the range, and the wind velocity and bearing, and to read the values of sight angle and sight deflection resulting when the said various inputs have been introduced in the instrument, said values being then set in the gun sights, with the addition of spot corrections if desired. While fire control instruments have been heretofore designed for somewhat similar purposes, they have been highly complicated and costly mechanisms, which are not portable and are incapable of use by other than highly trained personnel.

Accordingly, an object of the invention is to provide an improved fire control system of comparatively simple and inexpensive construction, employing calculating elements and associated mechanisms capable of easy assembly and adjustment in a very compact, light and portable computer, and wherein no backlash or lost motion will develop in any of the essential calculating elements or their operating mechanisms.

Another object is to replace the complicated calculating mechanisms usually employed by providing in lieu thereof, novel forms of charts and curves which greatly simplify the computations, so that they will not be difficult to read or understand, thus enabling the instrument to be conveniently operated by personnel having less experience than that usually required for fire control instruments of known types.

Another object is to provide for the addition of spot corrections in sight deflection and in range without disturbing the other settings of the instrument.

A further object is to maintain extreme accuracy in the instrument without the use of accurately machined parts or tedious and difficult adjustments. Such accuracy is obtained by the novel arrangement and control of charts provided in the instrument, and is determined primarily by the accuracy of the input quantities set in the instrument, rather than by any limitations established by the instrument itself.

The above and other objects will appear more clearly from the following detailed description when taken in connection with the accompanying drawings, which illustrate a preferred em-

2 bodiment of the inventive idea; but it is to be expressly understood that said drawings are employed only for the purpose of describing the invention as a whole and not to define the limits thereof, reference being had to the appended claims for this purpose.

In the drawings:

Fig. 9 is a schematic diagram in perspective showing all the essential features of the invention.

To aid in a complete understanding of the invention, the method of mathematically establishing the procedure of calculating sight angle and sight deflection from the given inputs of relative target bearing, own ship speed, target angle, target speed, present range, wind bearing and wind velocity, will first be explained. These quantities will be defined by reference to Figs. 1 to 3, and, as will be seen, the mathematical relationship derived will permit the solution of the fire control problem by the use of simple charts, rather than by the usual expensive and complicated mechanisms heretofore employed. The methods employed in constructing the charts based on these mathematical relationships will be next explained by reference to Figs. 4 to 8, and finally the method of utilizing the charts in the complete invention will be illustrated by Fig. 9.

Figure 1:
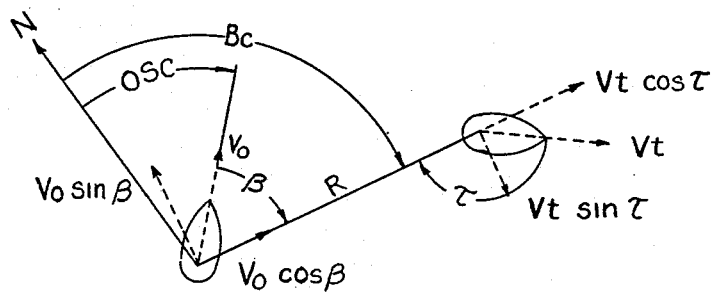
Fig. 1 is a diagrammatic view illustrating the method of resolving the components of motion in the fire control problem.

In Fig. 1, the own ship is proceeding at a speed of Vo knots. The position of the target relative to the own ship is indicated by the relative target bearing B and the present range R. The target is proceeding at a speed $Vt$ and the target angle is $\tau$. The angles $B$ and $\tau$ are measured clockwise from the bows of the ship to the line of sight. The components of relative speed between the own ship and the target are found by resolving the speed of each ship into components along the line of sight and across the line of sight. Addition of these components with the proper signs will give the range rate and the linear bearing rate.

Range rate $\dot{R}$ will be assumed positive when the range is increasing. The compass bearing $Bc$ of the target is equal to $B$ plus own ship's course, designated by OSC. The linear bearing rate $\dot{RBc}$ will be assumed positive when the target is apparently moving toward the right, that is, when the line of sight is rotating clockwise as viewed from the own ship.

Figure 2:
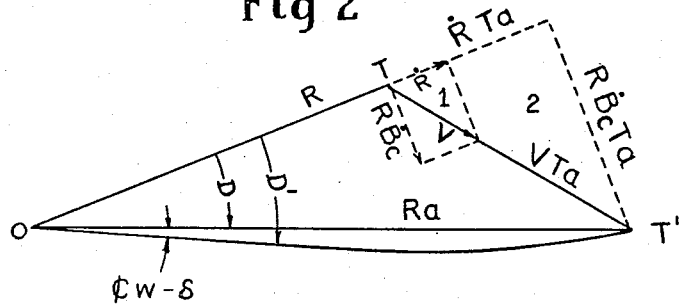
Fig. 2 is a similar view illustrating the present position of the target relative to the own ship.
Figure 3:
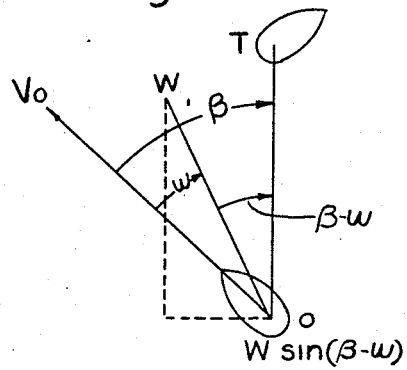
Fig. 3 is a diagrammatic view illustrating the resolution of the wind correction to be applied.

Expressing $Vo$ and $Vt$ in yards per second and expressing the time rate of change of any quantity by placing a dot over the character designating it, the range rate is (1) $\qquad \dot{R} = -Vo \cos B - Vt \cos \tau$ The linear bearing rate is (2) $\qquad \dot{RBc} = Vo \sin B + Vt \sin \tau$ Fig. 2 illustrates the method of solution of the problem. The own ship and target are respectively at positions O and T when the gun is fired, the intervening present range being R. V is the velocity of the target relative to the own ship, and has components $\dot{R}$ and $\dot{RBc}$ which are measured respectively along and perpendicular to the line of sight. During the time of flight $Ta$ of the shell, the apparent relative motion of the target will cause it to move to some position T'. Triangles 1 and 2 are similar, the sides of triangle 2 being, respectively, $Ta$ times as large as the sides of triangle 1. It is required to find the sight deflection D between the line of sight and the line of fire, and the sight angle or angle of elevation of the gun above the horizontal at the advance range $Ra$. From Fig. 2 it is seen that (3) $\qquad Ra \sin D = R\dot{B}cTa$ (4) $\qquad Ra \cos D = R + \dot{R}Ta$ Since the sight deflection D does not ordinarily reach a value of more than about six degrees, $\cos D$ may be assumed equal to unity without introducing appreciable error. Designating the average velocity $$\frac{Ra}{Ta}$$

of the shell over its trajectory by $m$, and putting $\cos D$ equal to unity, these become:

(5) $\qquad \sin D = \dfrac{R\dot{B}c}{m}$ (6) $\qquad m = \dfrac{R}{Ta} + \dot{R}$ Fig. 3 illustrates the method of resolving wind. A correction for cross wind only is made in the apparatus. The correction for wind in the line of fire is neglected. The angle $w$ between the bow of the ship and the direction from which the wind of velocity W is blowing is called the relative direction of the apparent wind. Although the wind should be resolved across the line of fire, negligible error and appreciable simplification result from resolving it across the line of sight. From Fig. 3 the cross wind component is seen to be given by the expression $W \sin (B-w)$.

If D' is the corrected deflection, $D' = D + \phi w - \delta$ where $\phi w$ is the cross wind correction and $\delta$ the drift correction, expressed as angular corrections to the deflection D. Drift correction is obtained from a standard U. S. Navy data table and as the drift is always to the right, its correction is always subtracted, hence $-\delta$.

Then $\sin D' = \sin (D + \phi w - \delta) =$
$\qquad \sin D \cos (\phi w - \delta) + \cos D \sin (\phi w - \delta)$ Since $\phi w - \delta$ does not exceed 2.8°, its cosine can be assumed equal to unity, and its sine equal to the angle. As $\cos D$ has also been assumed equal to unity, $$\sin D' = \sin D + \phi w - \delta$$

If $u$ is the angular correction for cross wind of unity velocity, $uW \sin (B-w)$ is the correction for wind of velocity $W \sin (B-w)$ and thus $$\sin D' = \frac{R\dot{B}c}{m} + uW \sin (B-w) - \delta$$

(7) $\qquad \sin D' = \dfrac{R\dot{B}c}{m} + \dfrac{muW \sin (B-w)}{m} - \dfrac{\delta m}{m} = \dfrac{x}{m}$ where for brevity $x = R\dot{B}c + muW \sin (B-w) - m\delta$.

The method of employing the equations in the mechanism can now be indicated. By resolving tse own ship's and target's speed along and perpendicular to the line of sight by means of resolvers and adding the components appropriately, $\dot{R}$ and $\dot{RBc}$ can be obtained from Equations 1 and 2.

Since $Ta$ depends upon $m$, the $\dot{R}$ and R thus determined can be employed to find $m$ from (6).

As previously described, $m$ is defined as being equal to $Ra/Ta$. The standard U. S. Navy range tables for surface guns list the corresponding values of $Ra$ and $Ta$. By dividing each $Ra$ by its corresponding $Ta$, there is obtained the corresponding $m$ and from this a table may be formed having values of $Ta$ corresponding to $m$ for a gun having a specific known muzzle velocity. Thus, if $m$ is known, $Ta$ is known and is a function of $m$ and Equation 6 may be written as $$m = \frac{R}{\text{Function of } m} + \dot{R}$$

Therefore, only $\dot{R}$, R and $m$ are involved in said equation and so, for any pair of R and $\dot{R}$, the value of $m$ is determined and can be calculated. Having the value of $m$, the observed value of the wind velocity and of the wind direction, the quantity $muW \sin (B-w)$ can be obtained. The quantity $m\delta$ can also be determined from $m$. Thus all the quantities in (7) are determined and the value of the corrected sight deflection D' can be found. As sight angle is a function of range or of $m$, it can be found from $m$.

Differentiating the equation, $$\sin D' = \frac{x}{m}$$

gives $$\cos D' \Delta D' = \frac{\Delta x}{m}$$

Since D' is never greater than about 8°, $\cos D'$ can be assumed equal to unity, which will reduce the equation to $$\Delta D' = \frac{\Delta x}{m}, \quad \text{or} \quad \Delta x = m \Delta D'$$

This equation may be used to establish a method of adding spot corrections to sight deflection. An increase in D' to D'+ΔD' can be expressed as (8) $$\sin(D' + \Delta D') = \frac{x + m\Delta D'}{m}$$

ΔD' lies between ±25 mils or ±1.5° and its cosine lies between ±0.9997 and, for purposes of the present invention, is taken (with very small error) to be unity and, therefore, with a high degree of accuracy, ΔD' may be assumed equal to the sin ΔD'. Thus to add the spot correction ΔD', the quantity $m\Delta D'$ is added to $x$.

To add a spot correction ΔRa to the advance range Ra, it is necessary only to select a value of sight angle which corresponds to Ra+ΔRa, or to $m + \Delta m$, where $\Delta m$ is the change in $m$ corresponding to ΔRa. Since $m$ by definition is Ra/Ta and Ta itself depends on Ra, so does $m = Ta/Ra$ and Ra depends on $m$ or the quantity Ra is a function of $m$, or $Ra = F_1(m)$, and $\Delta Ra = F_2(m)\Delta m$ or $$\Delta m = \frac{\Delta Ra}{F_2(m)}$$

Thus, sight angle at Ra+ΔR may be expressed as (9) $$\text{Sight angle} = F\frac{Ra}{m + Fa(m)}$$

Figure 4:
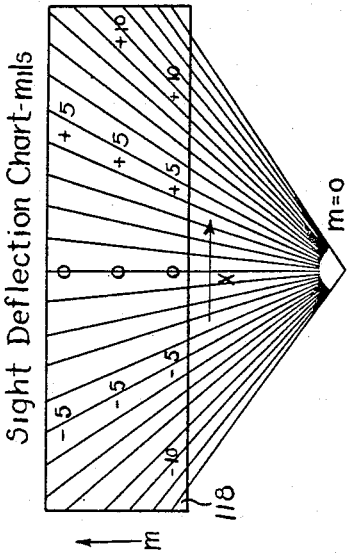
Fig. 4 is a view illustrating the method of constructing a chart giving sight deflection as a function of average shell velocity and bearing rate.

It is evident that (7) can be written as $$x = m \sin D'$$

which for given values of D' is the equation of a straight line passing through the origin of a set of axes along which $x$ and $m$ are measured. This is illustrated in Fig. 4, where these straight lines are plotted for various values of D' marked on the lines. Thus for any pair of values of $m$ and $x$ which are computed from the given data and the chart moved to the corresponding position, the sight deflection D' can be read from the curve to which the pair corresponds.

Figure 5:
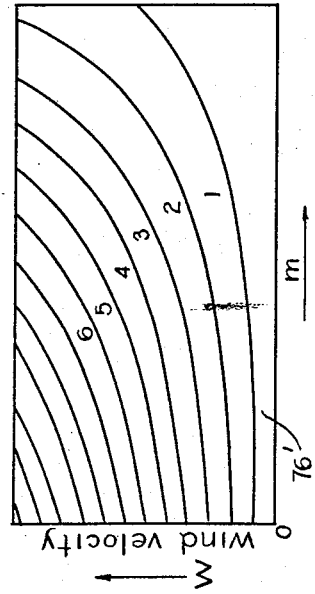
Fig. 5 is a plan view of a wind correction chart employed in connection with the invention.

From standard range tables the values of unit wind correction $u$ can be obtained for various values of $m$ and corresponding values of $um$ may be calculated. At a given wind velocity W, the quantity $muW$ will depend upon W and $m$, and if curves are plotted of the quantity $\gamma = muW$ for various values of $\gamma$ against axes W and $m$, the curves of Fig. 5 are obtained. The values of $\gamma$ or $muW$ are shown on the curves. Since the curves are multiples of each other, the chart Fig. 5 is essentially a multiplying device, from which multiple values of $muW$ can be read.

Figure 6:
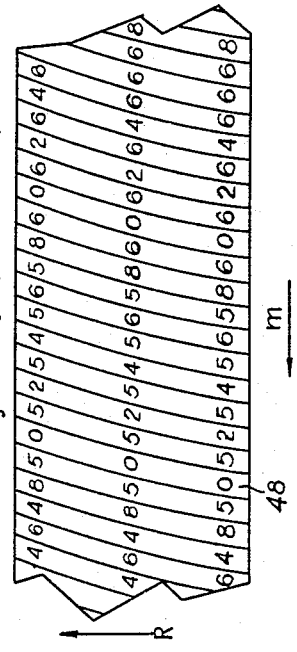
Fig. 6 is a fragmentary plan view of a chart displaying present range, and used to produce average shell velocity.

Since $m$ and Ta are related or dependent quantities in the Equation 6

$$m = \frac{R}{Ta} + \dot{R}$$

it appears that curves may be plotted of various values of present range R against axes of $m$ and $\dot{R}$. Fig. 6 is a portion of a chart giving curves of present range R as a function of $m$ and $\dot{R}$.

Figure 7:
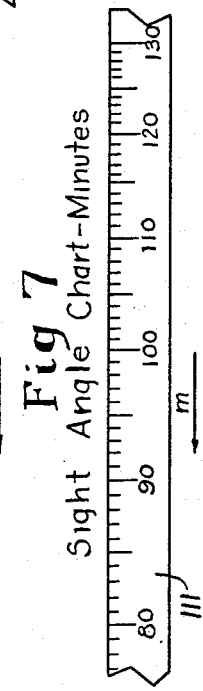
Fig. 7 is a fragmentary plan view of a chart displaying sight angle as a function of average shell velocity.

For any given value of $m$ or of $m + \Delta m$ there will exist a definite value of sight angle. Fig. 7 illustrates a chart or tape on which sight angle is shown as a function of $m$.

Figure 8:
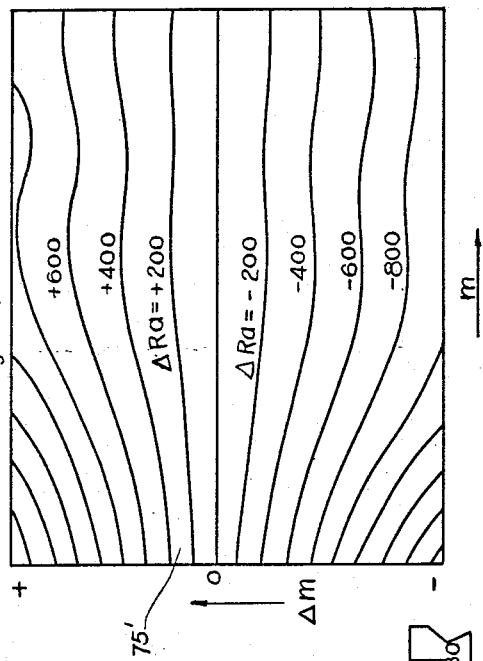
Fig. 8 is a plan view of a chart displaying spot corrections in range.

The equation for range spot correction $$\Delta m = \frac{\Delta Ra}{F_2(m)}$$

indicates that curves may be plotted of various values of ΔRa against axes of Δm and $F_2(m)$. Fig. 8 is a chart giving curves of ΔRa as a function of $m$ and $\Delta m$.

The equation for spot correction in sight deflection $\Delta x = m\Delta D'$ is in the same form as $$x = m \sin D'$$

which was represented by Fig. 4, and therefore can be shown on a similar chart.

Referring to Fig. 9, the numerals 11 and 12 indicate graduated dials of own ship and target resolvers, respectively, between which extends the line of sight 13. In order to set in the given relative target bearing data on the peripheral degree scale of the dial 11, a knob 14 on the panel of the instrument is connected to said dial by the gear 15. A second scale 16 radially arranged on the dial 11 is graduated in knots of ship's speed with 0 speed at the center of the dial. For the purpose of setting in the target angle τ in the target resolver, the dial 12, also having a circular degree scale, is rotated by means of a gear 17 operated by the knob 18. Said dial 12 is also provided with a radial scale 19 similar to the scale 16.

Associated with own ship dial 11 and arranged above the same are two overlapping strips 20 and 21 of transparent material, having, respectively, the cross hairs 22 and 23. The strip 20 is arranged parallel to the line of sight 13, while the strip 21 is disposed across the line of sight and at right angles to the strip 20. One end of the strip 20 is fixed to a follower nut 24 through which extends a screw 25 geared to a handle 26, so as to move the nut 24 along the screw and thus adjust the strip 20 when said handle is rotated. Similarly, the strip 21 is carried by the follower nut 27 mounted on the screw 28 geared to the handle 29. After the dial 11 has been adjusted to indicate the relative target bearing, the own ship velocity is indicated on the scale 16 by adjusting the two strips 20, 21 by amounts equal to the own ship's components of speed across the line of sight and in the line of sight, until the cross hairs 22, 23 intersect on said scale at the given value of the own ship's speed. Like the dial 11, the dial 12 also has associated therewith transparent strips 30 and 31 carried, respectively, by the follower nuts 32 and 33 mounted on the screws 34 and 35, with the former geared to the handle 36 and the latter to the handle 37. Thus, after the dial 12 has been set to the given target angle τ, the overlapping strips 30, 31 are adjusted until their respective crosshairs 38, 39 intersect on the scale 19 at the given target speed, said target angle and speed being obtained by observation and the employment of standard means for estimating the same. As with the own ship dial 11, said cross hairs move by amounts which are equal to the components of motion of the target in the line of sight and at right angles thereto.

The components of own ship and target speeds in the line of sight effected by the adjustments above described, are added or combined in order to obtain the range rate $\dot{R}$. To accomplish this, a flexible element 40 in the form of a steel tape, wire, or the like, has its ends secured to the follower nuts 27 and 33, and its intermediate portion is extended around a fixed idler pulley 41 and a movable pulley 42, the shaft 43 of which is carried by a bar 44 slidable in guides 45. A tension spring 46 is secured to the bar 44 so as to maintain a tension upon the tape 40 at all times regardless of the position of the follower nuts 27, 33. With this arrangement, a motion of either nut through a given distance will cause the pulley 42 to move through half that distance. Therefore, a transparent strip 47 carried by the movable bar 44 and having the cross hair 47', will be moved by an amount which is equal to half the sum of the motions of said follower nuts 27, 33. These motions imparted to the transparent strip 47 represent the range rate $\dot{R}$ which will be employed in the calculation of future or advance range and average shell velocity to be obtained from the chart 48 (Fig. 6) over which the strip 47 is adjustable. Said chart is movably mounted upon an adjusting unit consisting of upper and lower pairs of rollers 49, 50, and 51, 52, respectively, with the ends of the chart extended around the lower rollers and the intermediate portion extended over the upper rollers so that the chart will be rolled up on one or the other rollers in accordance with the direction of rotation of the drive roller 49, which carries sprocket teeth 53 at each end engageable in openings formed in the edges of the chart. Said chart is maintained taut on said rollers by a constant tension exerted on the roller 51 by a spring 54 coiled on the shaft of said roller. Said spring is interposed between and has its ends joined to the roller 51 and a gear 55 loose on said shaft. The gear 55 is connected to a similar gear 56 on the shaft of the roller 52 by means of an idler 57. During assembly of the unit, the chart 48 is placed in position on the rollers, and with idler 57 disconnected from the gear 55 and with the rollers 51, 52 held stationary, said gear 55 is turned to place the spring 54 under tension. The idler 57 is then engaged with the gears 55, 56, and due to the torque exerted by the spring 54, a tension will be maintained on the chart 48. Since the gears 55, 56 must rotate by the same amount, this tension will remain substantially constant, regardless of the position to which the chart may be adjusted.

The handle 58 provides the input for present range by means of which the average shell velocity $m$ for a given advance range is established. Said handle is geared to the shaft 59 which, through the gear 60 thereon, drives the gears 61 and 62 on the shaft 63, and further drives the gears 64 and 65 on the shaft 66. Said shaft 66 extends through the differential assembly indicated by the differential spider gear 67. Said gear 65 drives the roller 49 through the two idler gears 68, so that a turning movement of the shaft 59 in either direction will be transmitted to the roller 49, whereby the chart 48 will be transferred from the roller 51 to the roller 52, or vice versa, and thus moved relative to the cross hair 47' on the transparent strip 47.

Thus the inputs to the range chart are the present range introduced into the instrument by operation of the handle 58, and the range rate $\dot{R}$ which is set in by the operation of the own ship and target resolvers. When said resolvers are set in the machine by setting Vo, B, Vt and T, the value $\dot{R}$ is computed by Equation 1 and fed into the chart representing Equation 6. Turning the $m$ handle 58 until the index covers the value of $\dot{R}$ (known from the range finder on board ship) determines $m$ and positions the $m$ shaft. Thus by (6) the average shell velocity $m$ for the given advance range is established as a rotation of the shaft 59 which positions the drift cam 69, the drum 74 on which is mounted the sight deflection spot chart 74', the range spot drum 75 and the wind correction drum 76, as follows: The worm gear 72 on shaft 59 engages with the worm wheel 73 attached to the cam 69. The gear 77 on shaft 59 drives gear 78 and worm 79 on shaft 80, the said worm 79 in turn engaging gear 81 to drive the sight deflection spot drum mounted on shaft 82. Gear 83 on said shaft 82 engages with gear 84 on shaft 85 to rotate the attached drum 75 on which is mounted the range spot chart 75'. Worm 86 mounted on said shaft 80 engages with gear 87 on shaft 89 to drive the attached wind correction drum 76.

The range spot chart 75' described with reference to Fig. 8 is wrapped on the range spot drum 75, the $m$ axis extending circumferentially around the said drum. Thus rotation of the said drum in accordance with the given value of $m$ will bring the said chart to the correct position under the axially movable cross hair 90, which is carried upon and moved by the nonelastic wire or tape 91. One end of said tape 91 is attached to the clock spring unit 92, which tends to rotate in the direction shown, thereby producing tension in said tape. From said spring unit 92, said tape 91 is led successively over idler pulleys 93, 94, 95 and 96 and is wrapped upon pulley 97. Gear 98 is attached to said pulley 97, and meshes with gear 99. The handle 100 and the pulley 103 are attached to said gear 99. Rotation of the said handle 100 will therefore rotate the pulley 97 through the gears 98 and 99. Rotation of the said pulley 97 will move the said cross hair axially along the drum 75, with or against the tension exerted by spring unit 92. Thus the positioning of the cross hair 90 over the chart 75' to any desired value of range spot $\Delta R a$, as indicated in the description with reference to Fig. 8, may be produced by an appropriate manipulation of the handle 100.

The rotation of the pulley 103 and of the attached tape 101 is therefore a measure of $$\Delta m = \frac{\Delta Ra}{F_2(m)}$$

and will be added to $m$, in a manner to be described, in order that the proper sight angle may be indicated as corresponding to $m+\Delta m$ or to the range+range spot. The said tape 101 is led from pulley 103 over idler pulley 102 and is attached to pulley 104. The clock spring unit 105, pulley 104, and pinion 106 are mounted on a sleeve 107, which is free to rotate on shaft 66. Tension is maintained in the tape 101 by the spring unit 105, which tends to rotate the said sleeve assembly in the direction shown by the arrow. The tension in the tape 101 will balance the tension in the tape 91, through the geared pulleys 103 and 97, and thus any tendency for the handle 100 to rotate from the tape tension will be eliminated.

The internal gear 109 is attached to and rotates with shaft 66. The two pinions 108 rotate freely on shafts attached to gear 67, and mesh with both the said internal gear 109 and the pinion 106. This gear structure constitutes one form of the well known spur gear differential, having two inputs represented by the rotation of sleeve 107 and the rotation of the internal gear 109, and an output equal to the rotation of gear 67, said output being equal to the sum of said inputs, or as previously described, to $m+\Delta m$. Said output of gear 67 drives the sight angle chart 11, illustrated by Fig. 7 through the two idler gears 110. The structure, method of mounting, and the operation of the chart 111 are in general identical with those described with reference to the present range chart 48. Thus values of sight angle corresponding to $m+\Delta m$, or to advance range plus range spot, may be read from the said chart 111, with reference to the stationary index 112.

As previously described, rotation of the handle 58 is employed to set in the average shell velocity $m$ on the shaft 59. Said shaft 59 drives shaft 63 through gears 60 and 61. Gear 113 is attached to shaft 63, and drives the idler gear 114 which in turn drives the rack 115. The transparent strip 116 carrying the cross hair 117 is attached to rack 115, and is thereby adjusted in position over the sight deflection chart 118. The structure and method of mounting of the said chart 118 are identical with those described with reference to the present range chart 48. However, the drive roller 119 is mounted on shaft 120, which carries the pulley 121 and the torsion spring 122. The non-elastic wire or tape 123 is attached to and wrapped on the said pulley 121. Said torsion spring 122 is arranged to apply a torsional reaction to the said pulley 121, in the direction of the adjacent arrow, and will therefore maintain tension in the tape 123. The release or the pulling of the tape 123 will therefore rotate the pulley 121 to drive the chart 118 with or against the torsion spring 122.

From Equations 2, 7, and 8 it appears that $$\sin (D'+\Delta D') = \frac{Vo \sin B + Vt \sin \tau + muW \sin (B-w) - m\delta \pm m\Delta D'}{m}$$

As has been previously described, the values of $(D'+\Delta D')$ can be read from the chart of Fig. 4, corresponding to chart 118, at given values of $(x+\Delta x)$ and $m$, where $(x+\Delta x)$ can be considered as the numerator of the above equation. It is therefore necessary to position the chart 118, or to operate the tape 123 in accordance with the numerator of said equation, and to position the cross hair 117 as described in order that the values of corrected sight deflection D' or $D'+\Delta D'$ may be read on the chart 118. It will now be shown how each of the various quantities in said numerator can be derived from the mechanism and additively introduced as the motion of the tape 123.

The drift cam follower 71 is pivoted at 70 and is operated by the cam 69 through an angle which corresponds to $m\delta$. One end of the tape 123 is attached to the free end of the follower 71, and therefore moves a corresponding distance $m\delta$.

As previously mentioned, the equation for spot correction in sight deflection is $\Delta x = m\Delta D'$, the corresponding chart consisting of a series of straight lines with a common point of origin. The sight deflection spot drum 74 has wrapped upon it a chart similar in construction to that illustrated by Fig. 4, with the $m$ axis extending in a circumferential direction around the drum. The transparent strip 125, carrying the cross hair 124, is located above the said drum 74. The handle 128 is geared to lead screw 127, which moves the traveling nut 126 on which said strip 125 is mounted, thus permitting the movement of the cross hair 124 along the drum 74. After the said drum 74 has been positioned in accordance with the quantity $m$, the handle 128 is operated to move the cross hair 124 over the chart to the line designating the appropriate spot correction $\Delta D'$. The movement of the cross hair 124 is then the required $\Delta x$. The pulley 129, attached to the underside of the traveling nut 126, is moved an equal amount. The tape 123 passes over the stationary guide pulley 130, the said movable pulley 129 and then over the stationary guide pulley 131. The movement $\Delta x$ of the said pulley 129 will therefore cause a proportional change in the length of the tape 123 looped around it.

The gear 15 which positions the own ship dial 11 is also geared to drive the dial 132. The index 133 is placed at the edge of dial 132, and is arranged to move in synchronism with the bow of the own ship dial, so that the angle B is represented between the index 133 and a vertical line through the dial center. The dial 134 is mounted on the sleeve 135, concentric with dial 132, and is driven from knob 136 through gears 137, 138 and 139. Said dial 134 is graduated circumferentially in degrees, and also has a radial scale of wind correction $muW$, with zero wind correction at the dial center. In operation of the said dial 134, the relative direction $w$ of the apparent wind is set in on the dial 134 with respect to the previously adjusted index 133. The angle $B-w$ is therefore represented between the radial scale of $muW$ and the vertical line through the dial center.

The wind correction drum 76, which is rotated by the quantity $m$, has a chart 76' represented by Fig. 5 wrapped on it, with the $m$ axis extending in a circumferential direction around the drum. A linear scale 140 of wind velocity W in knots is placed adjacent to the drum 76. After the drum 76 has been properly positioned in accordance with the quantity $m$, the wind correction $muW$ can be read from the chart at any given valued wind velocity W.

The handle 144 is geared to the lead screw 145, which moves the traveling nut 146. The transparent strip 143, carrying the cross hair 142, is disposed above the dial 134, and is attached to the said traveling nut 146. Movement of the handle 144 therefore permits the cross hair 142 to be positioned at the value of $muW$ on the radial scale 141, as read from the wind correction chart 76'.

As indicated, the traveling nut 146 and its attached pulley 147, are then displaced by the amount of $muW \sin (B-w)$. The tape 123 is guided over the fixed idler pulley 148 and is then looped over the movable pulley 147, causing any displacement of said pulley 147 to produce a proportional movement of tape 123. Said tape 123 is then looped around the movable pulley 150 attached to the traveling nut 24 to impart the own ship's component of motion $Vo \sin B$ across the line of sight, to the movement of tape 123, the movement of the said traveling nut 24 being previously described with reference to dial 11. Said tape 123 is next guided in turn over the fixed idler pulleys 149 and 151, the movable pulley 152 attached to the traveling nut 32, the idler pulley 153, and is attached to the drive pulley 121. As described with reference to dial 12, the movement of the traveling nut 32 is the target's component of motion $Vt \sin \tau$ across the line of sight, which is thereby added to the motion of tape 123. Thus all the various quantities $$Vo \sin B + Vt \sin \tau + muW \sin (B-w) - m\delta + m\Delta D'$$

are imparted additively to the motion of the tape 123, and the sight deflection corresponding to this motion and to the quantity $m$, can be read from the sight deflection chart 118.

The operation of the instrument may be briefly summarized as follows:

1. Set the own ship dial 11 to the relative target bearing B, which moves the index 133 on dial 132 to an equal angle.

2. Set the vertical and horizontal own ship's cross hairs 22 and 23 to intersect at own ship speed, giving the component in the line of sight $Vo \cos B$ and the component across the line of sight $Vo \sin B$.

3. Set the target dial 12 to the target angle $\tau$.

4. Set the vertical and horizontal target cross hairs 38 and 39 to intersect at target speed, giving the component in the line of sight $Vt \cos \tau$ and the component across the line of sight $Vt \sin \tau$.

5. Set present range on the range chart. This positions the shaft 59, which drives the sight deflection cross hairs 117, the sight angle chart 112, the drift cam 69, the wind correction drum 76, the sight deflection spot drum 74, and the range spot drum 75.

6. Set the dial 134 to the apparent direction $w$ of the relative wind W with reference to the index 133 on the dial 132.

7. Read the value of $muW$ on the wind correction chart 76', corresponding to the observed value of wind velocity W, and set the cross hair 142 on the radial wind dial scale 141.

8. Set the cross hairs 90 to the desired spot $\Delta R$ in range on the range spot chart 75'.

9. Set the cross hairs 124 to the desired spot $\Delta D$ in sight deflection on the sight deflection spot chart 74'.

10. Read sight angle on chart 111 and sight deflection on chart 118.

As the mechanism of the instrument is required to drive only charts and dials, its construction may be very light, and does not require the use of ball bearings except in the pulley system which controls the sight deflection tape 123. It will be noted that none of the usual calculating elements are used, the calculations being performed by the use of charts. Great accuracy and facility in reading the charts may be secured by lengthening the charts to any suitable degree. This involves only appropriate changes in the gear ratios and does not increase the weight or cost of the instrument.

While one form of the invention has been described, it will be appreciated that various modifications can be made in the embodiment, arrangement, and application of the various principles described to the problem of gun fire control. The same mathematical formulae may be solved by equivalent calculating elements, as for example, by substituting mechanical calculating devices for charts and curves, in the event it is desired to employ automatic inputs or outputs. The systems of tape and pulleys employed for the addition and the conveyance of quantities involved in the calculations is especially subject to wide modifications. The scope of the invention is therefore not to be limited except as indicated by the following claims.

What is claimed is:

1. In a fire control system, mechanisms to obtain the components of own ship and target speeds in the line of sight including follower members, a transmitting mechanism including a fixed and a movable pulley, a flexible element extending around said pulleys and having its ends connected to said follower members so as to be operable thereby to move said movable pulley to thereby combine said components to determine range rate, an indicator connected with said movable pulley and movable therewith along one coordinate, a chart-carrying drum operatively associated with said indicator and movable along another coordinate, and input means for moving said drum relative to said indicator to establish average shell velocity for a given advance range.

2. In a fire control system, means to compute sight deflection comprising mechanisms to obtain the cross components of own ship and target speeds, adjusting means for said mechanisms including follower members, a chart-carrying drum movable along one coordinate and an indicator associated with said drum and movable along another coordinate, a drive for said drum, gearing for operating said indicator, an input shaft coupled to said gearing for operating the same to move said indicator, a drift cam also driven by said shaft and having a follower, and a flexible element having one end connected to the drive for said drum and its other end connected to said follower, with intermediate portions thereof operatively connected to the first named follower members.

3. In a fire control system, means to compute sight deflection comprising mechanisms to obtain the cross components of own ship and target speeds, adjusting means for said mechanisms including follower members, a chart-carrying drum movable along one coordinate and an indicator associated with said drum and movable along another coordinate, a drive for said drum, gearing for operating said indicator, an input shaft coupled to said gearing for operating the same to move said indicator, a drift cam also driven by said shaft and having a follower, wind correction means including a follower member, and a flexible element having one end connected to the drive for said drum and its other end connected to said drift cam follower, with intermediate portions thereof operatively connected to the first and last named follower members.

4. In a fire control system, means to compute sight deflection comprising mechanisms to obtain the cross components of own ship and target speeds, adjusting means for said mechanisms including follower members, a chart-carrying drum movable along one coordinate and an indicator associated with said drum and movable along another coordinate, a drive for said drum, gearing for operating said indicator, an input shaft coupled to said gearing for operating the same to move said indicator, a drift cam also driven by said shaft and having a follower, a second drum for carrying a sight deflection spot chart and operatively connected to said input shaft, an indicator associated with said second drum and including a follower member, and a flexible element having one end connected to the drive for the first named drum and its other and connected to said drift cam follower, with intermediate portions thereof operatively connected to the first and last named follower members.

5. In a fire control system, means to compute sight deflection comprising mechanisms to obtain the cross components of own ship and target speeds, adjusting means for said mechanisms including follower members, a chart-carrying drum movable along one coordinate and an indicator associated with said drum and movable along another coordinate, a drive for said drum, gearing for operating said indicator, an input shaft coupled to said gearing for operating the same to move said indicator, a drift cam also driven by said shaft and having a follower, wind correction means including a follower member, a second drum carrying a sight deflection spot chart and operatively connected to said input shaft, an indicator associated with said second drum and including a follower member, and a flexible element having one end connected to the drive for the first named drum and its other end connected to said drift cam follower, with intermediate portions thereof operatively connected to all of said follower members.

6. In a fire control system, means to compute sight deflection comprising mechanisms to obtain the cross components of own ship and target speeds, adjusting means for said mechanisms including follower members, a chart-carrying drum movable along one coordinate and an indicator associated with said drum and movable along another coordinate, a drive for said drum, gearing for operating said indicator, an input shaft coupled to said gearing for operating the same to move said indicator, a drift cam also driven by said shaft and having a follower, a second drum for carrying a sight deflection spot chart, an indicator associated with said second drum including a follower member, means operatively connecting said input shaft to said second drum, a third drum carrying a spot range chart and operatively connected to said second drum, a fourth drum carrying a sight angle chart and operatively connected to said second and third drums through said input shaft, and a flexible element having one end connected to the drive for the first named drum and its other end connected to said drift cam follower, with intermediate portions thereof operatively connected to all said follower members.

EARL E. LIBMAN.